US008408157B2

(12) United States Patent
Ling

(10) Patent No.: US 8,408,157 B2
(45) Date of Patent: Apr. 2, 2013

(54) PAINTING APPARATUSES AND METHODS

(75) Inventor: Jeremy Ling, St. Paul, MN (US)

(73) Assignee: Depingo, LLC, Saint Paul, MN (US)

(*) Notice: Subject to any disclaimer, the term of this patent is extended or adjusted under 35 U.S.C. 154(b) by 628 days.

(21) Appl. No.: 12/047,660

(22) Filed: Mar. 13, 2008

(65) Prior Publication Data

US 2008/0223292 A1 Sep. 18, 2008

Related U.S. Application Data

(60) Provisional application No. 60/894,727, filed on Mar. 14, 2007, provisional application No. 60/997,813, filed on Oct. 5, 2007.

(51) Int. Cl.

| | |
|---|---|
| ***B05C 1/06*** | (2006.01) |
| ***B05C 1/14*** | (2006.01) |
| ***B05C 1/08*** | (2006.01) |
| ***B05C 11/00*** | (2006.01) |
| ***A46B 11/00*** | (2006.01) |
| ***A46B 11/04*** | (2006.01) |
| ***A46B 13/00*** | (2006.01) |
| ***B43K 5/06*** | (2006.01) |
| ***B43K 5/00*** | (2006.01) |
| ***A47L 13/22*** | (2006.01) |
| ***A47L 11/00*** | (2006.01) |
| ***A63B 47/04*** | (2006.01) |
| ***A63D 5/10*** | (2006.01) |
| ***B60S 3/00*** | (2006.01) |

(52) U.S. Cl. ........ 118/264; 118/256; 118/259; 118/260; 118/265; 118/266; 401/119; 401/176; 401/179; 401/180; 401/204; 401/270; 15/22.1; 15/97.1

(58) Field of Classification Search .......... 118/256–265, 118/266; 401/219, 119, 176, 179, 180, 204, 401/270; 15/22.1, 97.1
See application file for complete search history.

(56) References Cited

U.S. PATENT DOCUMENTS

| | | | | |
|---|---|---|---|---|
| 1,818,281 | A | 8/1931 | Soss | |
| 2,295,849 | A | 10/1940 | Kayden | |
| 2,509,954 | A | 5/1950 | Barnes et al. | |
| 2,913,151 | A | 11/1959 | Wiseman et al. | |
| 3,030,652 | A | 4/1962 | Whitfield et al. | |
| 3,175,242 | A | 3/1965 | Kamondy et al. | |
| 3,231,151 | A | 1/1966 | Clark et al. | |
| 3,231,917 | A * | 2/1966 | Reed | 15/98 |

(Continued)

OTHER PUBLICATIONS

"Quick Painter Instructions", www.homeright.com/manuals/820327-a.pdf, (Aug. 2002),2 pgs.

(Continued)

*Primary Examiner* — Dah-Wei Yuan
*Assistant Examiner* — Binu Thomas
(74) *Attorney, Agent, or Firm* — Merchant & Gould P.C.

(57) ABSTRACT

This document discusses, among other things, an apparatus for painting a work surface including a handle housing. A disposable painting module is configured to be removably engaged with the handle housing. The painting module includes a paint applicator configured to be removably engaged with the handle housing. The paint applicator is configured to apply paint to the work surface. A paint reservoir is fluidly coupled with the paint applicator and is configured to be removably engaged with the handle housing. An urging mechanism is coupled to the handle housing and configured to interact with the paint reservoir to substantially uniformly discharge the paint from the paint reservoir and supply the paint to the paint applicator.

21 Claims, 16 Drawing Sheets

U.S. PATENT DOCUMENTS

| | | | | |
|---|---|---|---|---|
| 3,441,355 | A | 4/1969 | Brown | |
| 3,561,360 | A | 2/1971 | Branfield et al. | |
| 4,167,349 | A | 9/1979 | Testa | |
| 4,202,333 | A * | 5/1980 | Thill et al. | 604/135 |
| 4,222,678 | A | 9/1980 | Miller | |
| 4,250,586 | A * | 2/1981 | Timian | 401/204 |
| 4,293,584 | A * | 10/1981 | Clayton | 427/11 |
| 4,298,000 | A | 11/1981 | Thill et al. | |
| 4,422,788 | A | 12/1983 | Braithwaite et al. | |
| 4,430,079 | A | 2/1984 | Thill et al. | |
| 4,431,326 | A | 2/1984 | Braithwaite et al. | |
| 4,457,642 | A | 7/1984 | Braithwaite et al. | |
| 4,537,522 | A | 8/1985 | Charney et al. | |
| 4,552,477 | A | 11/1985 | Braithwaite et al. | |
| 4,566,816 | A | 1/1986 | Janssen | |
| 4,597,754 | A | 7/1986 | Thill et al. | |
| 4,611,941 | A | 9/1986 | Karliner et al. | |
| 4,732,503 | A | 3/1988 | Bader et al. | |
| 4,955,748 | A | 9/1990 | Krumholz | |
| 4,983,061 | A | 1/1991 | Demarest | |
| 5,054,947 | A | 10/1991 | Frank et al. | |
| 5,181,636 | A | 1/1993 | Anderson et al. | |
| 5,189,751 | A | 3/1993 | Giuliani et al. | |
| 5,299,877 | A | 4/1994 | Birden | |
| 5,331,710 | A | 7/1994 | Tollasepp | |
| 5,407,287 | A | 4/1995 | Braun et al. | |
| 5,413,258 | A | 5/1995 | Kartler | |
| 5,454,656 | A | 10/1995 | Rowe | |
| 5,496,123 | A * | 3/1996 | Gaither | 401/176 |
| 5,692,642 | A | 12/1997 | Brattesani | |
| 5,887,765 | A | 3/1999 | Broesamle | |
| 5,890,249 | A | 4/1999 | Hoffman | |
| 5,933,905 | A | 8/1999 | Hess | |
| 5,946,760 | A | 9/1999 | Eames | |
| 6,056,466 | A | 5/2000 | Johnson et al. | |
| 6,099,184 | A | 8/2000 | Koptis | |
| 6,206,599 | B1 | 3/2001 | Buchanan et al. | |
| 6,276,860 | B1 | 8/2001 | Nakajima et al. | |
| 6,294,021 | B1 | 9/2001 | Platzcke et al. | |
| 6,425,701 | B1 | 7/2002 | Jacobs | |
| 6,453,498 | B1 | 9/2002 | Wu | |
| 6,530,107 | B2 | 3/2003 | Kim | |
| 6,865,769 | B1 | 3/2005 | Sorenson | |
| 6,893,180 | B2 | 5/2005 | Hall et al. | |
| 6,899,485 | B2 | 5/2005 | Hall et al. | |
| 6,976,802 | B2 | 12/2005 | Hall et al. | |
| 6,981,611 | B2 | 1/2006 | Carruth et al. | |
| 6,986,618 | B2 | 1/2006 | Hall et al. | |
| 6,986,619 | B2 | 1/2006 | Hall et al. | |
| 6,986,620 | B2 | 1/2006 | Abbas | |
| 7,004,658 | B2 | 2/2006 | Hall et al. | |
| 7,024,718 | B2 | 4/2006 | Chu et al. | |
| 7,048,458 | B2 | 5/2006 | Hall et al. | |
| 7,090,421 | B1 | 8/2006 | Mead et al. | |
| 7,182,538 | B2 | 2/2007 | Grosso et al. | |
| 7,407,336 | B2 * | 8/2008 | Giacomo | 401/219 |
| 7,517,334 | B2 | 4/2009 | Jacobs et al. | |
| 7,588,196 | B2 | 9/2009 | Kubota et al. | |
| 7,909,529 | B2 | 3/2011 | Gallardo | |
| 2003/0005536 | A1 | 1/2003 | Kim | |
| 2004/0107525 | A1 | 6/2004 | Newman et al. | |
| 2004/0205914 | A1 | 10/2004 | Holden et al. | |
| 2005/0111905 | A1 | 5/2005 | Glover | |
| 2005/0238413 | A1 | 10/2005 | Grosso et al. | |
| 2006/0039742 | A1 | 2/2006 | Cable, Jr. et al. | |
| 2006/0213017 | A1 | 9/2006 | Bele et al. | |
| 2006/0233596 | A1 * | 10/2006 | Fisher | 401/219 |
| 2006/0265821 | A1 | 11/2006 | Hause | |
| 2007/0020034 | A1 | 1/2007 | Wang | |
| 2007/0020035 | A1 | 1/2007 | Bruggeman et al. | |
| 2007/0086831 | A1 | 4/2007 | Wold | |
| 2007/0110505 | A1 | 5/2007 | Frank et al. | |
| 2008/0145137 | A1 | 6/2008 | Bruggeman et al. | |

OTHER PUBLICATIONS

"Wagner USA—Wagner Trim-It", http://www.wagnerspraytech.com/portal/trim_it_spray,43353,747.html, (accessed Feb. 27, 2008),1 pg.

* cited by examiner

PAINTING APPARATUSES AND METHODS

CROSS-REFERENCE TO RELATED APPLICATIONS

This patent application claims the benefit of priority, under 35 U.S.C. Section 119(e), to U.S. Provisional Patent Application Ser. No. 60/894,727, entitled "Powered Paint Applicator", filed on Mar. 14, 2007, and U.S. Provisional Patent Application Ser. No. 60/997,813, entitled "Vibrating Paint Tool with Dispensing Reservoir", filed on Oct. 5, 2007, the entireties of which are incorporated herein by reference.

BACKGROUND

When painting a surface, particularly in a trimming context, it is common to apply paint to a work surface in close proximity to another surface, which is either not to be painted or to be painted a different color, for instance. This other surface can be, for example, a window, a raised molding, an intersecting wall, an intersecting ceiling, etc. Various paint applicators exist for performing the trimming function. Such trimming tools have changed little over the years.

Various paint applicators have been devised for performing the trimming function. Paint brushes are one such type of paint applicator. Paint brushes can be inefficient and can be difficult to use to uniformly coat a surface with paint, potentially leaving brush marks or uneven color coverage. Paint brushes can also require a relatively large number of brush strokes to adequately coat an area, which can be time consuming, uncomfortable, and fatiguing to a painter. Furthermore, it can be difficult to control the bristles of a brush, which could result in getting paint on undesired surfaces unless such surfaces are masked. However, masking such surfaces can be inefficient, time consuming, and tedious. Additionally, brushes can have limited paint carrying capacity, which could result in additional time and motion in repeatedly reloading the bristles with paint. Brushes can also be relatively burdensome to clean, but throwing brushes away and replacing them can be relatively costly.

Paint pads are another type of paint applicator for use in trim painting, for instance. In some instances, paint pads can be easier to control than, for instance, brushes to potentially avoid the step of masking surfaces that are not intended to receive paint. Additionally, some paint pads can be relatively cheap to buy, such that a user may be more inclined to throw away the pad to save cleaning time. However, paint pads can be difficult to use to uniformly coat a surface with paint, potentially leaving streak marks or uneven color coverage. Additionally, such paint pads are generally dragged across the work surface to apply paint thereto, which can include overcoming relatively high frictional forces between the pad and the work surface. This can result in a relatively uncomfortable and fatiguing hand motion and can also result in making the paint pad relatively difficult to control, and, in turn, less precise. Additionally, paint pads can have limited paint carrying capacity, which could result in additional time and motion in repeatedly reloading the pads with paint.

Some paint applicators, such as paint pad devices, can include paint reservoirs to limit paint reloading. However, such devices can be larger and heavier than other trimming tools and can be relatively clumsy to use and relatively difficult to control for trimming. Additionally, paint dispensing from the paint reservoirs of the devices can be uneven, sporadic, or otherwise difficult to control or gauge, which can lead to uneven paint coverage. Also, such devices can be relatively difficult to clean and can be fairly expensive to replace. For example, when cleaning such a device, it can be difficult, if not impossible, to completely wash all of the paint from bristles of the paint pad or the reservoir. The remaining paint in the bristles and the reservoir can harden and can lead to decreased performance in subsequent uses.

Overview

The present inventor has recognized, among other things, that there exists a need for a painting apparatus that allows for improved efficiency, paint coverage, paint uniformity, and control of paint delivery.

In some embodiments, an apparatus for painting a work surface includes a handle housing. A disposable painting module is configured to be removably engaged with the handle housing. The painting module includes a paint applicator configured to be removably engaged with the handle housing. The paint applicator is configured to apply paint to the work surface. A paint reservoir is fluidly coupled with the paint applicator and configured to be removably engaged with the handle housing. An urging mechanism is coupled to the handle housing and configured to interact with the paint reservoir to substantially uniformly discharge the paint from the paint reservoir and supply the paint to the paint applicator.

In some embodiments, an apparatus for painting a work surface includes a handle housing including an attachment surface configured to vibrate with respect to the handle housing. A disposable painting module is configured to be removably engaged with the handle housing. The painting module includes a paint applicator configured to be removably engaged with the attachment surface. The paint applicator is configured to apply paint to the work surface. A paint reservoir is fluidly coupled with the paint applicator and configured to be removably engaged with the handle housing. An urging mechanism includes a constant force spring. The urging mechanism is coupled to the handle housing and configured to interact with the paint reservoir to substantially uniformly discharge the paint from the paint reservoir and supply the paint to the paint applicator.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized, among other things, that there exists a need for a practical and cost effective powered paint applicator with a paint dispensing reservoir aimed at improving efficiency, coverage, uniformity, and control of paint delivery. It can be desirable that the apparatus includes a removable and disposable paint applicator and paint dispensing reservoir to make use and clean-up relatively efficient and relatively easy and to limit performance compromises of repeated cleaning and reuses. It can also be desirable that the device provide substantially uniform, continuous trimming capability so as to limit intermittent and varying paint dispensing rates. It can also be desirable for the device to provide relatively good tactile control and feedback to the user. It can be desirable for the device to be capable of operating from a battery source to limit, if not eliminate, reliance on AC power or power cords. It can also be desirable that the paint applicator be a lightweight hand-held apparatus to limit fatigue of the user.

The subject matter described herein may take form in various components and arrangements of components, and in various procedures and arrangements of procedures. The simplified drawings are only for purposes of conveying the basic design intent and illustrating various examples of the invention and are not to be construed as limiting the invention.

Figure 1:
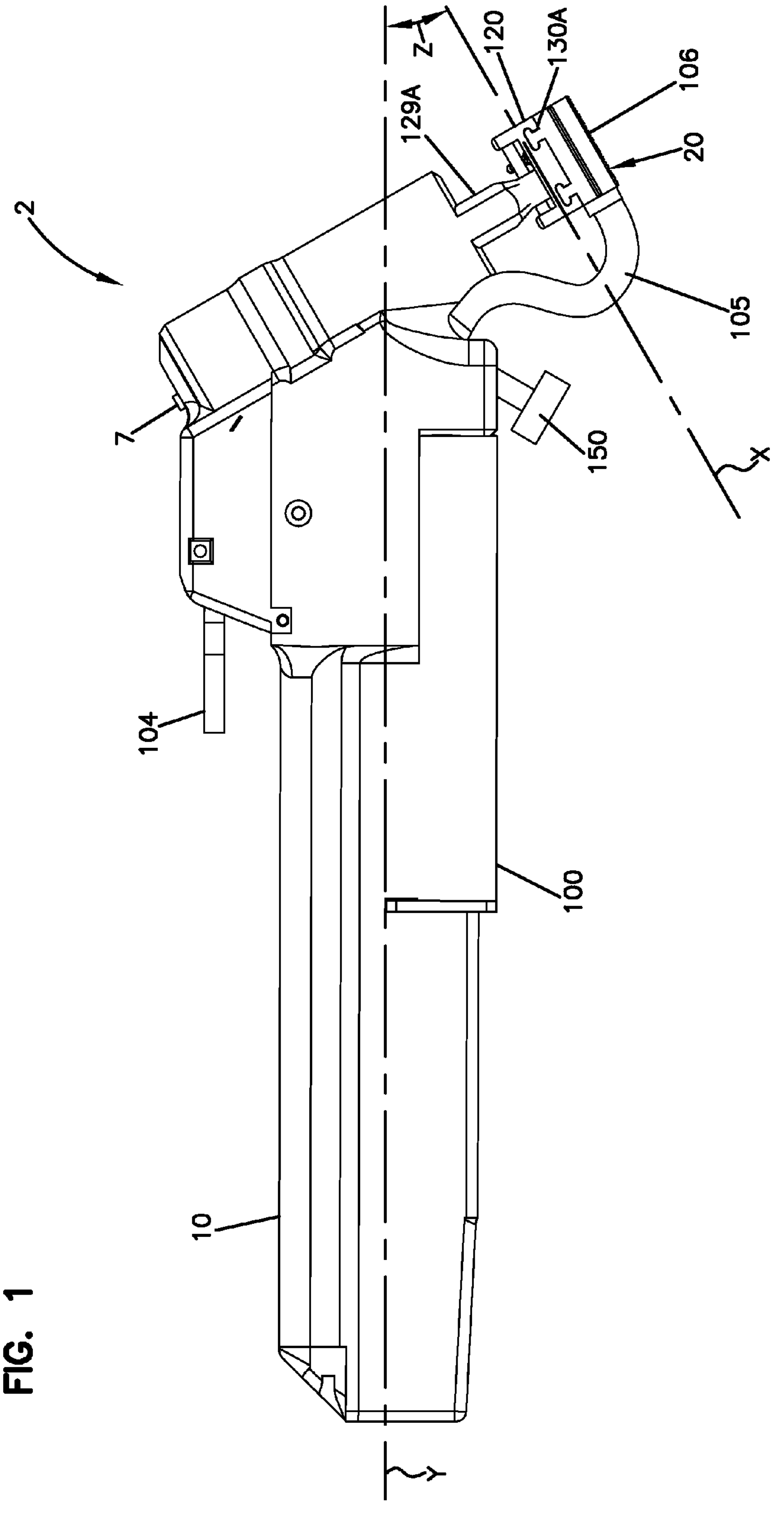
FIG. 1 is a side view of a painting apparatus according to some embodiments of the disclosed subject matter.
Figure 2:
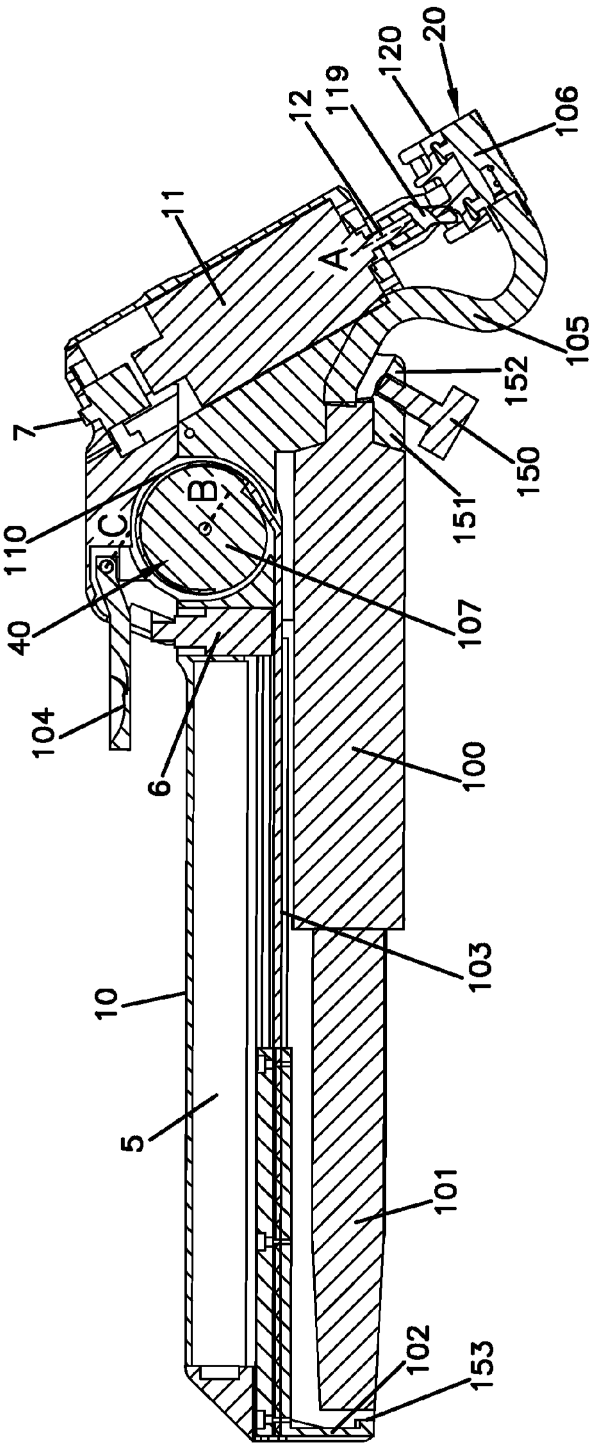
FIG. 2 is a side cross-sectional view of a painting apparatus according to some embodiments of the disclosed subject matter.

An example of a painting device or apparatus 2 is illustrated in FIG. 1 and is shown in section view in FIG. 2. In certain examples, the painting apparatus 2 is a vibrating paint tool with a dispensing reservoir for use in applying paint to a work surface. Referring to FIGS. 1 and 2, the device 2 includes a body 10. In certain examples, the body 10 is a handle housing that serves as a handle for a user to hold during use of the device 2. In one example, the body 10 is sized and shaped to allow for increased tactile feedback while painting. In certain examples, the body 10 includes a battery compartment 5 and a motor 11 disposed within the body 10. In certain examples, the motor 10 can be an electric motor, including, but not limited to a DC electric motor.

Figure 3:
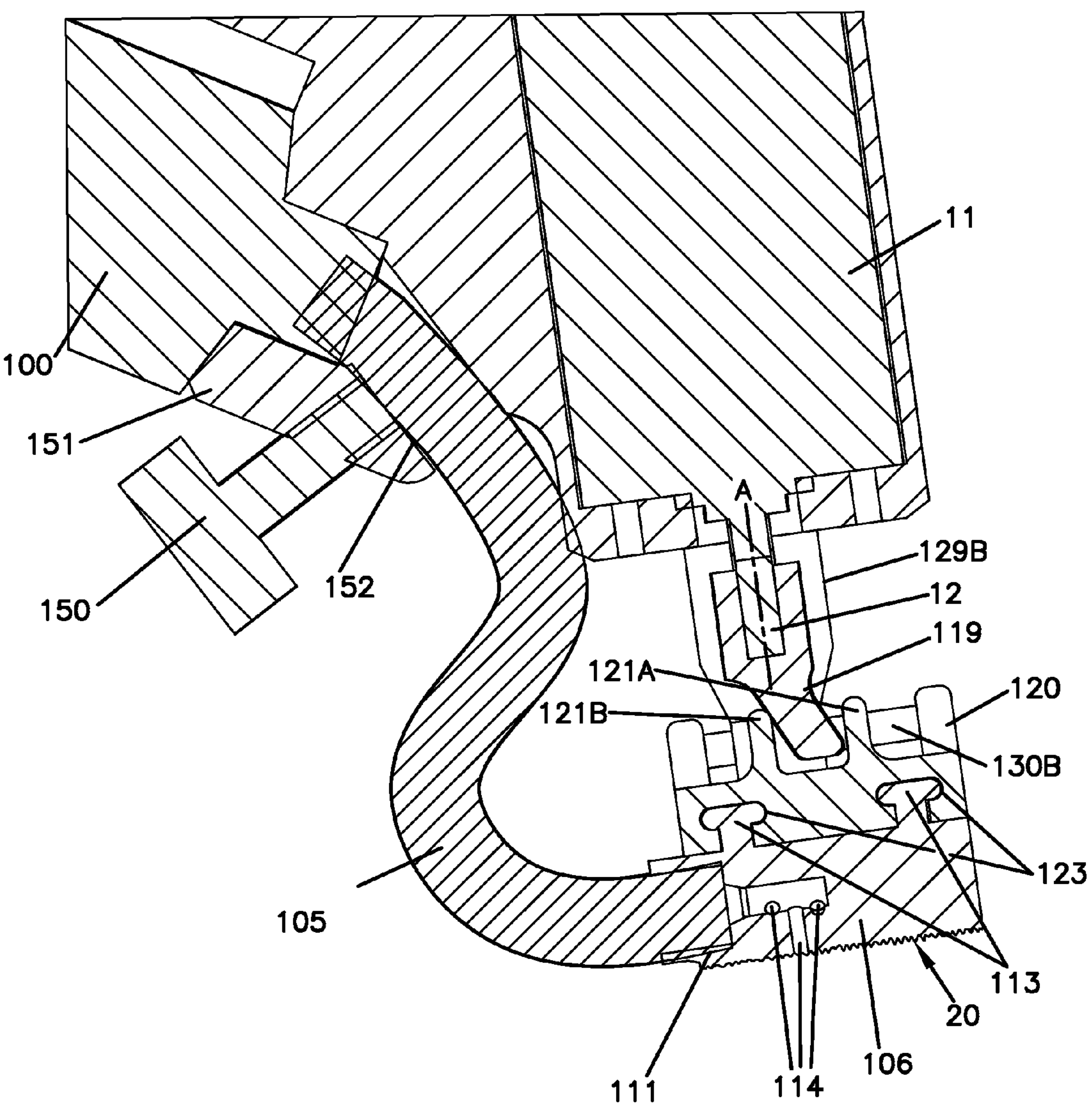
FIG. 3 is a cross-sectional view of a portion of a painting apparatus according to some embodiments of the disclosed subject matter, the painting apparatus including a paint applicator in a first position.
Figure 4:
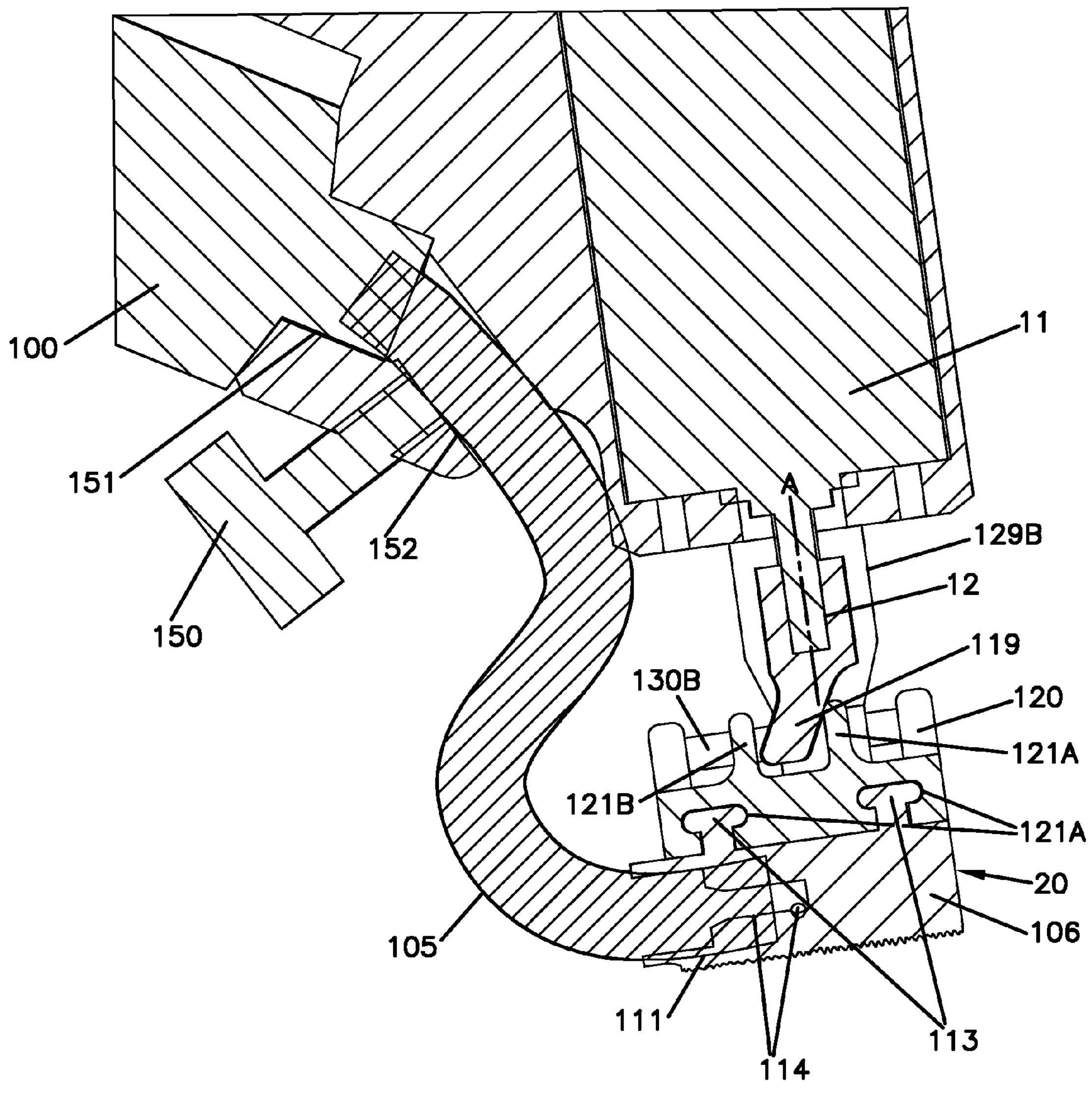
FIG. 4 is a cross-sectional view of a portion of a painting apparatus according to some embodiments of the disclosed subject matter, the painting apparatus including a paint applicator in a second position.

Referring to FIGS. 1-4, in one example, the motor 11 is a DC motor that receives current from one or more batteries within the compartment 5 via a momentary switch 6 and/or toggle switch 7. The motor output 12 couples to drive cam 119, as shown in FIGS. 2-4. When motor 11 receives current, the motor output 12 and a drive cam 119 rotate about a longitudinal axis A. In an example, the body 10 includes two support struts 129A, 129B, although in other examples, the body 10 can include more or less than two support struts. In some examples, a shuttle 120 attaches to the support struts 129A, 129B using shuttle pins 130A, 130B, as shown in FIGS. 1-4. The shuttle pins 130A, 130B can have a clearance connection with the supports struts 129A, 129B and can be rigidly connected to the shuttle 120. In some examples, as the drive cam 119 rotates about axis A, it comes into contact with a fore follower 121A and an aft follower 121B. In this manner, the shuttle 120 and shuttle pins 130A, 130B are caused to move. In some examples, the support struts 129A, 129B limit the motion of the shuttle pins 130A, 130B, and, in turn, the shuttle 120, to a single plane of motion disposed along a line X, which is substantially parallel with a longitudinal axis Y of the body 10. Referring specifically to FIG. 1, the line X is offset from the longitudinal axis Y by an angle Z. Depending upon the application of the device 2, in some examples, the angle Z can be between zero degrees and 180 degrees. In this example, each revolution of the drive cam 119 moves the shuttle 120 forward and backward a distance within the plane of motion. FIG. 3 shows the drive cam 119 and shuttle 120 generally in a forward-most position, and FIG. 4 shows the drive cam 119 and shuttle 120 generally in an aft-most position. In this way, the shuttle 120 can be reciprocated, oscillated, or otherwise vibrated along the line X.

In certain examples, a paint applicator 20, including a manifold 106 and a paint pad 15, can be coupled to the shuttle 120, as will be described in more detail below, to move with the shuttle 120 in a forward and backward motion along the work surface to be painted. Such forward and rearward motion substantially in line with the longitudinal axis Y of the body 10 can increase control and reduce drag while trimming or otherwise painting. In various examples, the paint applicator 20 can include a pad, a sponge, a brush, etc. In one example, the device 2 is pulled by the user in line with the longitudinal axis Y of the body 10. Oscillating or otherwise vibrating the paint applicator 20 against the work surface, substantially in line with the direction the user is pulling the device 2, can inhibit drag and increase control of the device 2. In other examples, other directions of vibration are contemplated. For instance, in one example, the direction of vibration is substantially perpendicular to the longitudinal axis Y of the body 10 (side to side motion). In such an example, moving the device 2 perpendicular to the longitudinal axis Y of the body 10 during painting could inhibit drag and increase control of the device 2. However, it is further contemplated that the user can move the device 2 in any direction with respect to the direction of vibration, although, if the direction of vibration is different from the direction of movement of the device, it can result in forces imparted in a different direction than the direction of trimming, which can increase resistance and decrease control. For example, if the direction of vibration were perpendicular to the direction of motion of the device, the vibrations of the paint applicator would tend to pull the device in a direction perpendicular to the direction of motion of the device, which can result in the paint applicator potentially pulling toward a surface that is not to receive paint.

Some other mechanisms for creating vibratory motion of a paint applicator against the work surface are described below or are contemplated herein. In various examples, motion of the paint applicator can be in virtually any direction, including forward and backward, side-to-side, circular, angular, etc. In other examples, motion of the paint applicator can be within a single plane or within multiple planes. In one example, motion of the paint applicator is into and away from the work surface to be painted. In further examples, it is contemplated that the device include a paint applicator with reconfigurable direction of vibration. For instance, the shuttle or other vibratory feature of the body can be selectively rotated or otherwise reconfigured to change the direction of vibration, for instance, between forward and backward motion, side-to-side motion, circular motion, angular motion, transverse motion (toward and away from the work surface), or incremental variations therebetween.

Figure 5:
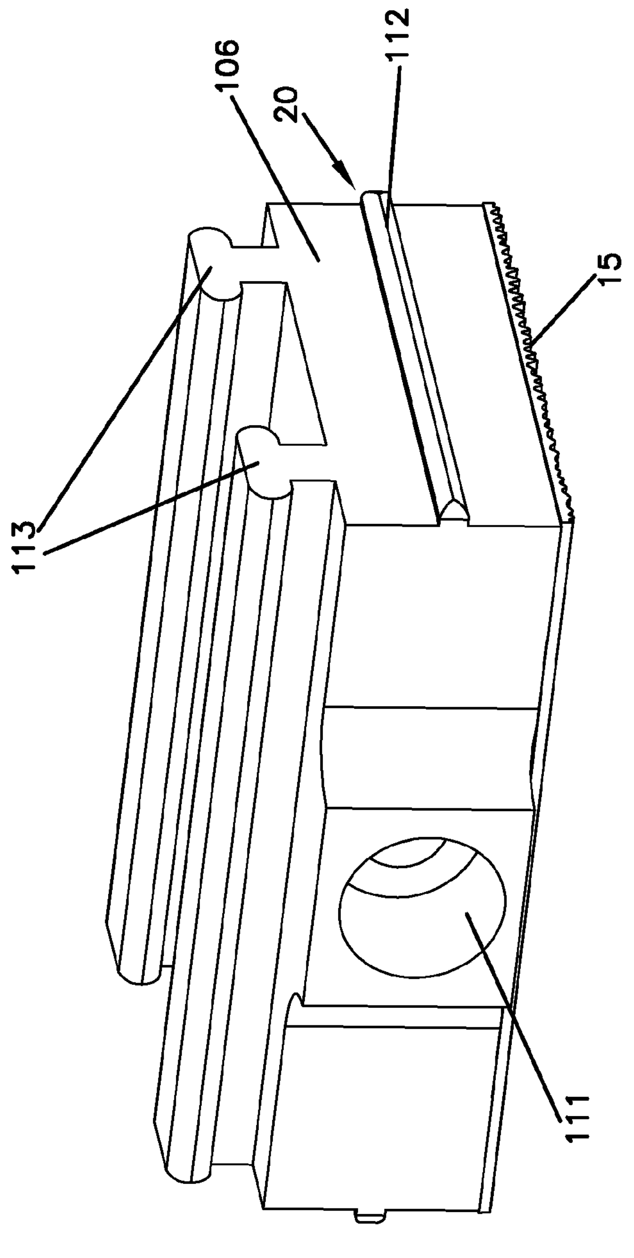
FIG. 5 is a perspective view of a paint applicator of a painting apparatus according to some embodiments of the disclosed subject matter.

Referring to FIGS. 3-5, in some examples, the manifold 106 is removably coupled to the shuttle 120 with slider features 113 on the manifold 106 and receiving guide tracks 123 on the shuttle 120. In this way, the shuttle 120 acts as an attachment surface to engage the manifold 106 of the paint applicator 20. In some examples, the guide tracks 123 and slider features 113 can provide a rigid connection between the manifold 106 and the shuttle 120 and allow for repeatedly connecting and disconnecting the manifold 106 to the shuttle 120. In one example, the paint pad 15 is part of and makes up one face of the manifold 106. In one example, the surface of the paint pad 15 includes a brush or bristle surface backed by a soft, fast reacting, cellular layer that helps accommodate surface irregularities of the work surface.

Figure 6:
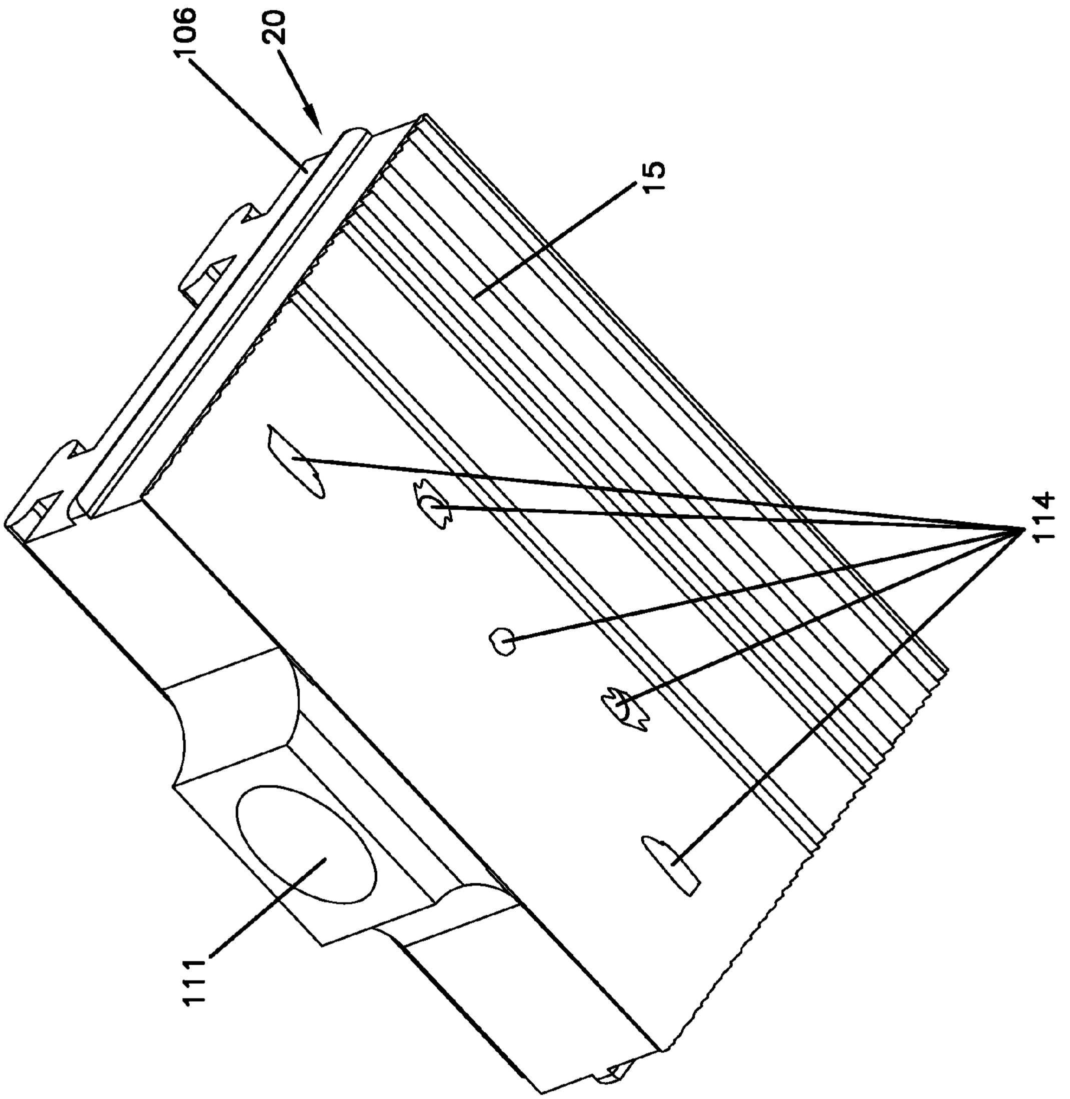
FIG. 6 is a bottom plan view of a paint applicator of a painting apparatus according to some embodiments of the disclosed subject matter.

Referring now to FIG. 6, the paint applicator 20 includes paint dispensing openings 114. In certain examples, different paint applicators can include openings that vary in number, size, location, and shape, for instance to tune the different paint applicators for different painting applications, different painting techniques, or different work surfaces. For instance, a particular paint applicator can be used to optimize distribution of paint onto the work surface.

In one example, the manifold 106 supplies the paint to the openings 114. In one example, the manifold 160 includes an edging feature 112 that assists in maintaining a small gap with a surface adjacent the work surface to inhibit application of paint on the adjacent surface. In certain examples, the manifold 106 includes a tube inlet 111 for connection with a paint feed tube 105. In one example, as shown in FIGS. 1-4, the paint feed tube 105 is pushed into the tube inlet 111 and is retained with an interference fit. In other examples, this connection could include a number of different connectors such as a barbed fitting, a luer lock, a push-to-connect configuration, etc. In still other examples, multiple paint feed tubes are connected to multiple tube inlets. In this way, the paint feed tube 105 and manifold inlet 111 supplies the paint to the manifold 106, which, in turn, supplies the paint to the openings 114, so that the paint can be supplied to the paint pad 15 to be applied to the work surface to be painted.

Figure 7:
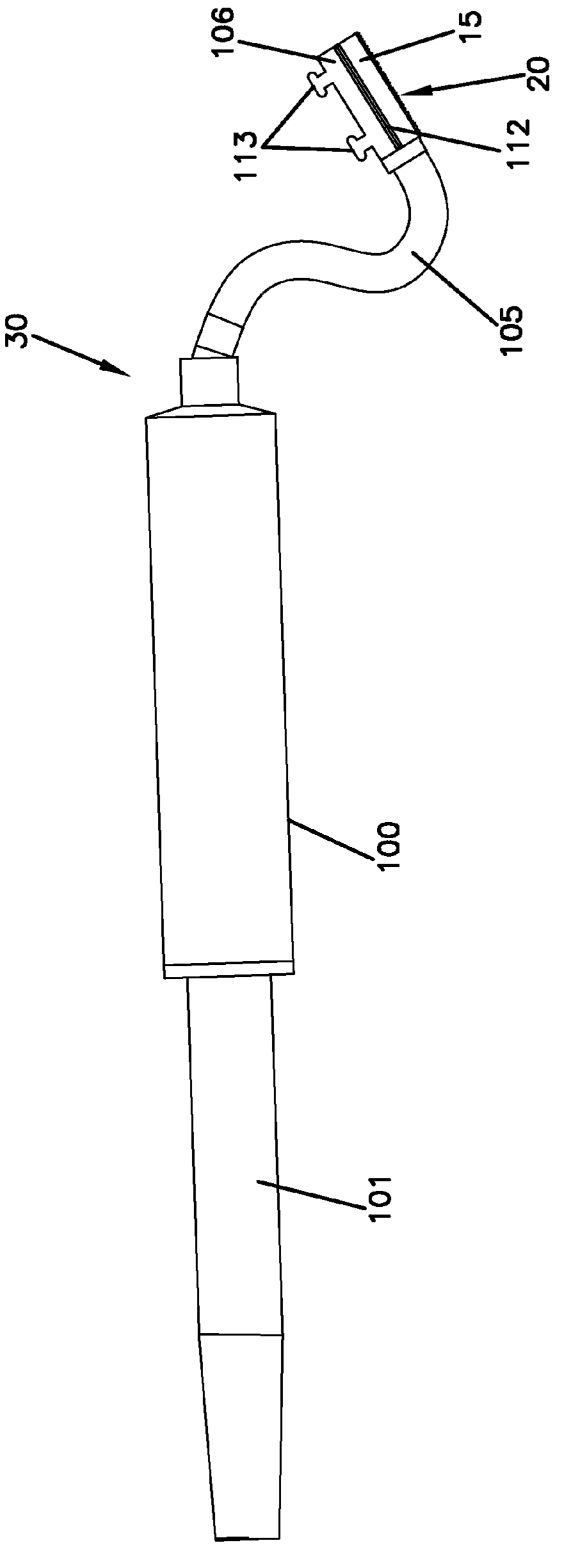
FIG. 7 is a side view of a painting module of a painting apparatus according to some embodiments of the disclosed subject matter.

Referring to FIG. 7, in some examples, removable, replaceable, and disposable paint-contacting pieces of the device 2 are included in a painting module 30. In certain examples, the painting module 30 includes the paint applicator 20, the paint feed tube 105, and a paint reservoir 100. In one example, the paint reservoir 100 is a syringe-style design including a plunger 101 to allow for paint filling and dispensing. Such a paint reservoir 100 can be produced relatively cheaply to make disposal and replacement relatively cost effective. Although a syringe-type paint reservoir 100 is described herein, other examples contemplated herein include other configurations of paint reservoirs.

In one example, the paint feed tube 105 can be permanently or releasably connected to a nozzle of the paint reservoir 100. In some examples, the painting module 30 includes the components of the device 2 that carry, transfer, and otherwise contact the paint. As such, by making the painting module 30 removable from the body 10, disposable, and replaceable, clean-up time for the device 2 can be reduced. Instead of washing paint pads, which can be tedious and time consuming and can result in the paint pads not performing as well after the initial use due to residual paint remaining on the paint pad, the used painting module 30 can be removed and replaced with a new, clean, replacement painting module 30. In this way, the disposable painting module 30 of the device 2 can save the user time, can increase ease of use of the device 2, and can enhance performance of the device 2 over multiple uses of the device 2.

Figure 8:
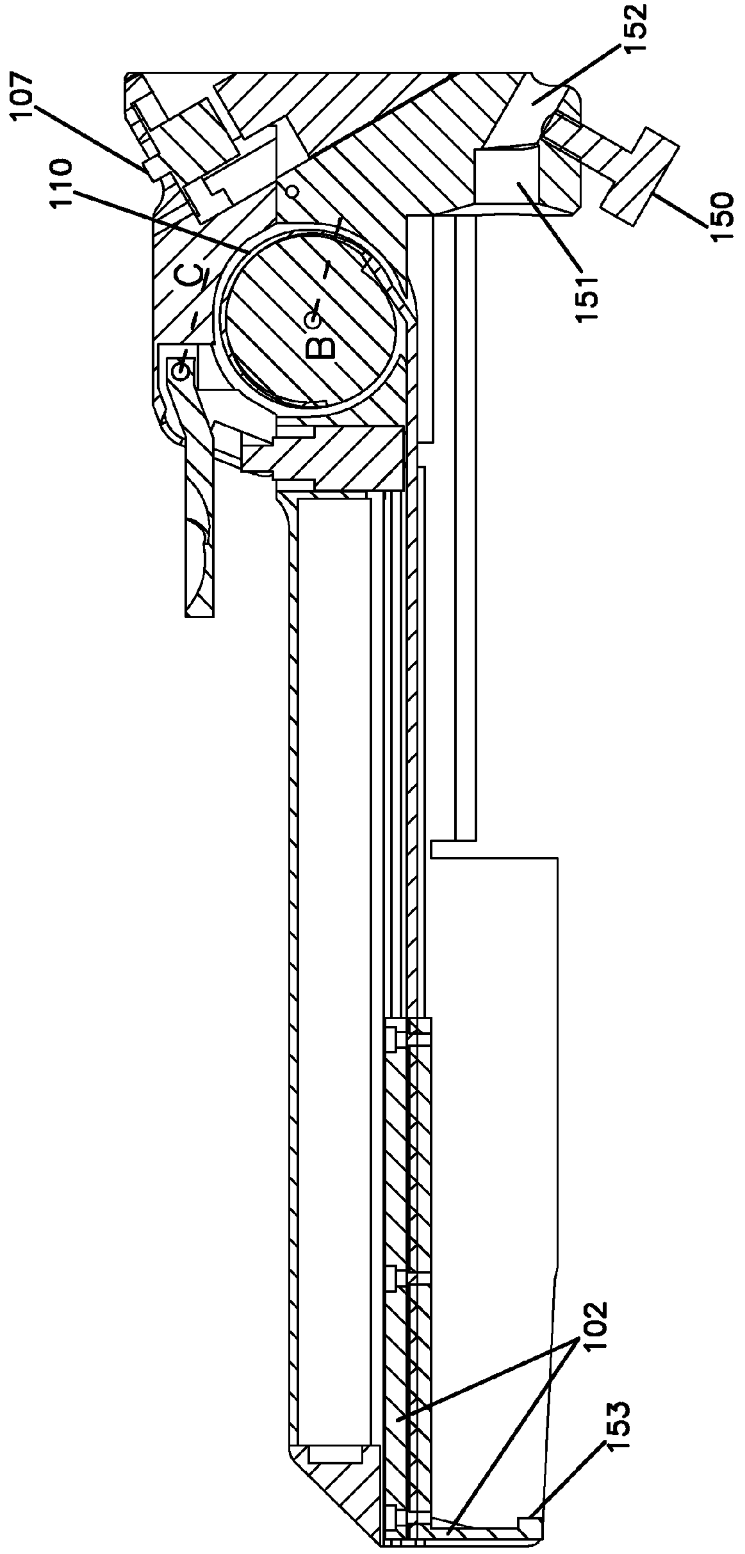
FIG. 8 is a perspective cross-sectional view of a painting apparatus according to some embodiments of the disclosed subject matter, the painting apparatus having a painting module removed.

Referring to FIGS. 1-8, in one example, to connect the disposable painting module 30 with the device 2, the slider features 113 of the manifold 106 are manually engaged with the receiving linear guide tracks 123 of the shuttle 120. A plunger advance bracket 102, as will be described in more detail below, can be manually retracted to a rearward position, as shown in FIGS. 2 and 8. The paint feed tube 105 and the paint reservoir 100 (in one example, at least partially filled with paint, as described above) can be guided into a nozzle cavity 151 and a tube cavity 152 of the body 10. With the paint reservoir 100 seated in the nozzle cavity 151, the plunger advance bracket 102 can be advanced so that, in one example, a plunger advance detent 153 captures the plunger 101. The paint feed tube 105 can be connected to the manifold 106 to complete attachment of the painting module 30 with the body 10. In this way, the device 2 can be configured to dispense paint.

In certain examples, referring to FIGS. 2 and 8, the plunger 101 is advanced to dispense paint by an urging mechanism 40. In one example, the urging mechanism 40 includes a constant force spring 103 to advance the plunger 101. In one example, one end of the constant force spring 103 can be connected to a drum 107, and the other end of the constant force spring 103 can be connected to the plunger advance bracket 102. In one example, the constant force spring 103 is biased to coil onto the drum 107. As the constant force spring 103 coils onto the drum 107, it exerts a force that pulls the plunger advance bracket 102 toward a forward position. In this way, in certain examples, the plunger advance bracket 102 is urged into motion and, in turn, advances the plunger 101 to supply the paint to the paint applicator 20. In an example, the constant force spring 103 provides a substantially constant, uniform advance force on the plunger advance bracket 102 as the constant force spring 103 coils around the drum 107, which is substantially maintained throughout the advance stroke. In this way, a relatively constant paint output rate can be achieved by using the constant force spring 103, which can result in a substantially uniform supply of paint to the paint applicator 20 to allow substantially uniform application of paint to the work surface. Although the constant force spring 103 is described herein for use with the urging mechanism 40, other examples of urging components can be used to advance the plunger 101, which are also contemplated herein. In some examples, compression or extension springs are used to exert an advance force on the plunger 101. In other examples, spring mechanisms such as elastic bands, power reels, or spring motors, for instance, can be used to advance the plunger 101. In still further examples, the plunger advance can be powered, for instance, using a motor and lead screw. In another example, the force for advancing the plunger 101 can be manually provided by the user. For instance, a mechanism similar to that of a caulking gun can be used to advance the plunger 101.

Figure 9:
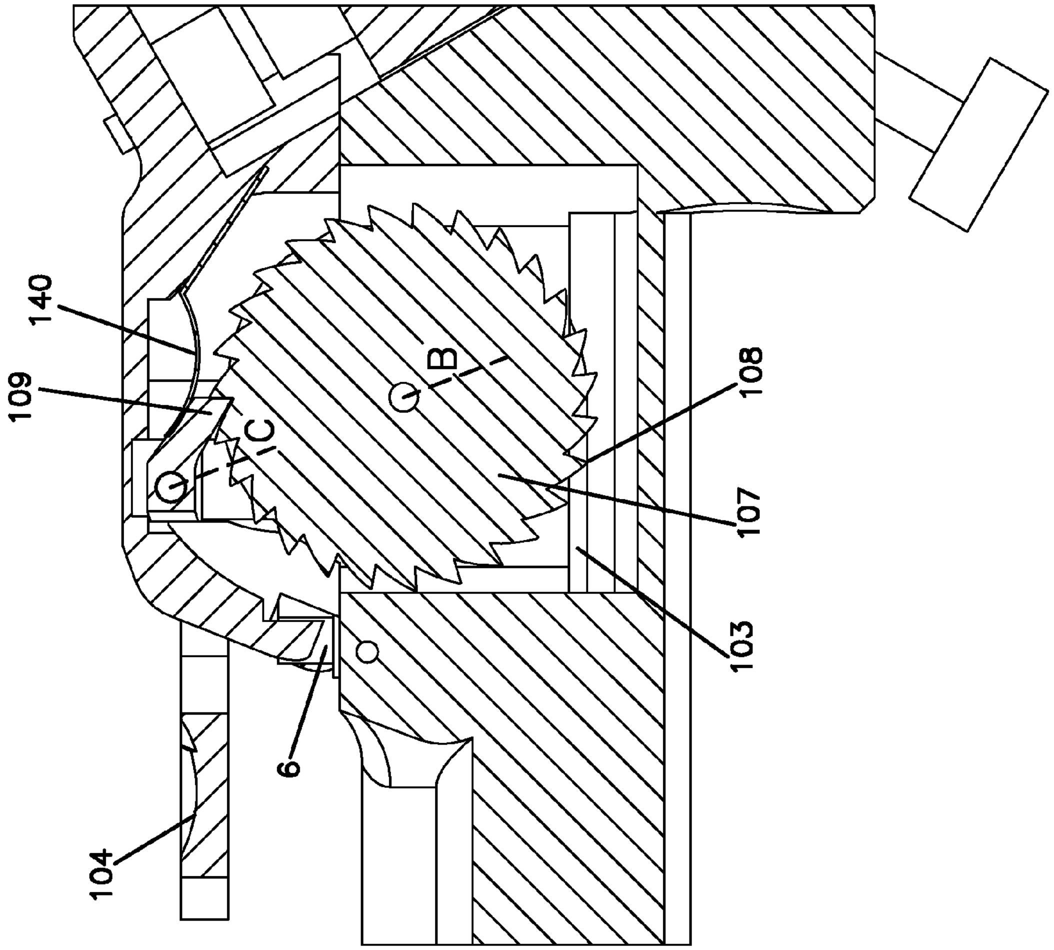
FIG. 9 is a cut-away side view of a portion of an urging mechanism of a painting apparatus according to some embodiments of the disclosed subject matter.

Referring to FIG. 9, an example of selectively activating paint dispensing provides an "on/off" mechanism to allow the user to inhibit paint dispensing when desired. In one example, the drum 107 includes a ratchet feature 108. In one example, a paint dispensing trigger 104 includes a pawl lever that pivots about axis C to selectively disengage with the ratchet feature 108 to allow rotation of the drum 107 and advancement of the plunger advance bracket 102. A spring tab 140, in one example, biases a pawl face 109 to engage the drum ratchet 108 to inhibit rotation of the drum 107, which, in turn, inhibits the constant force spring 103 from coiling to exert force on the plunger 101, thereby inhibiting dispensing of paint. In this example, when the paint dispensing trigger 104 is depressed (moved toward the body 10) by the user, the pawl face 109 pivots up and releases from the ratchet 108, which allows the drum 107 to turn as the constant force spring 103 coils to exert a force on the plunger 101 to dispense paint.

Such a design can facilitate loading and unloading of the paint reservoir 100. For instance, as the plunger advance bracket 102 is manually retracted, the drum 107 is forced to rotate about axis B, as is allowed by the geometry of the ratchet 108 and pawl 109. When this manual retraction is halted, the constant force spring 103 will exert force on the drum 107 to try to rotate the drum 107 in the opposite direction. However, the pawl face 109 can then engage the ratchet feature 108 to inhibit motion of the drum 107 and generally maintain the position of the plunger advance bracket 102. In this way, the plunger advance bracket 102 can be manually retracted to and retained at a location to allow sufficient clearance for loading and unloading the paint reservoir 100. Although the paint reservoir 100 has been described as being attached to and generally integral with the body 10 of the device 2, in further examples, it is contemplated that the reservoir be disposed generally remotely from the body and coupled to the paint applicator using an elongated paint feed tube. For instance, the paint reservoir can be located on a floor, ledge, or other surface, on a ladder platform or step, on the user, for instance, using a belt clip or other such attachment device, or the like. In further examples, paint can be dispensed from the paint reservoir using a manual or powered pump to create a pressure within the reservoir to force paint from the dispenser.

Referring again to FIGS. 2 and 8, in some examples, an enclosure 110 is disposed around the drum 107. The enclosure 110 can be configured to maintain a relatively small amount of clearance at least partially around the constant force spring 103 to inhibit the constant force spring 103 from diametrically expanding on the drum 107. For instance, when the pawl face 109 is engaged with the ratchet feature 108, the drum 107 is inhibited from rotating in the direction that the constant force spring 103 tends to coil. However, because of the coiling tendency of the constant force spring 103, the constant force spring 103 can tend to continue retracting and coiling on the drum 107 by expanding away from the drum 107. By providing the enclosure 110 around the drum 107, this coiling of the constant force spring 107 through expansion on the drum 107 can be inhibited.

Referring to FIGS. 8 and 9, in certain examples, the motor 11 can be selectively powered to oscillate or otherwise vibrate the paint applicator 20. In one example, a switch 6 can be a normally-open, momentary switch. In this example, depression of the paint dispensing trigger 104 (toward the body 10, in this example) can cause a portion of the paint dispensing trigger 104 to contact and close the momentary switch 6. This allows current to flow to the motor 11, which, in turn, can cause the motor output to rotate to move the paint applicator 20 in a vibratory or other motion. When the paint dispensing trigger 104 is released, a spring tab 140 can cause the paint dispensing trigger 104 to pivot away from the switch 6 to allow the switch 6 to return to its normally open state. In this way, paint dispensing and vibration of the paint applicator 20 both can be activated and halted through manipulation of the trigger 104. In another example, a toggle switch 7 can be used instead of or in addition to the switch 6. In one example, the toggle switch 7 can be manually turned on or off to bypass switch 6 and allow vibration without dispensing of paint, or just dispensing without vibration.

Referring to FIGS. 2-4 and 8, the device 2 can include a flow control mechanism 150. In one example, the flow control mechanism 150 can include a user adjustable thumb screw to impede paint flow through the paint feed tube 105 by incrementally collapsing the paint feed tube 105 in the tube cavity 152. By collapsing the paint feed tube 105, a lumen of the paint feed tube 105 is reduced to inhibit paint flow through the lumen. In certain examples, the flow control 150 can include user adjustable settings to allow the flow to be tuned to varying paint viscosities and the user's rate of painting or trimming. For instance, the pitch on the thumb screw of the flow control mechanism 150 can be such that one revolution results in range from zero to substantially completely occluded flow. In one example, tuning increments can be provided, such as increments that can correspond to, for instance, a quarter turn resulting in approximately 25% occlusion of the lumen of the paint feed tube 105, a half turn resulting in approximately 50% occlusion of the lumen of the paint feed tube 105, etc. In this way, combining a substantially consistent paint dispense rate with a user adjustable paint flow volume control can allow the user to relatively consistently apply a substantially uniform amount of paint to the work surface. In other examples, other types of flow controls are contemplated by the present subject matter, such as, for instance, adjustable nozzles, needle valves, adjustable pinch valves, etc.

In use, with reference to FIGS. 1-9, in certain examples, the user can obtain the disposable painting module 30 and attach the disposable painting module 30 to the body 10 of the device 2. For instance, the user can obtain a new disposable painting module 30 to replace a used painting module 30 that has been discarded. In an example, the user can attach the paint applicator 20 to the attachment surface of the shuttle 120 of the device 2. In certain examples, the user can place the end of the paint feed tube 105 into a bucket, tray, container, or other source of paint and draw back the plunger 101 to at least partially fill the syringe-style paint reservoir 100 with paint. In an example, the user can couple the paint reservoir 100 with the body 10 and the urging mechanism 40 of the device 2. The user, in one example, can connect the paint feed tube 105 to the manifold 106. In one example, the user can place the paint pad 15 to the work surface to be trimmed or otherwise painted and begin painting by pulling the device 2 along the work surface while depressing the paint feed trigger 104 to dispense paint and vibrate the paint applicator 20 as the trigger 104 is depressed.

Figure 10:
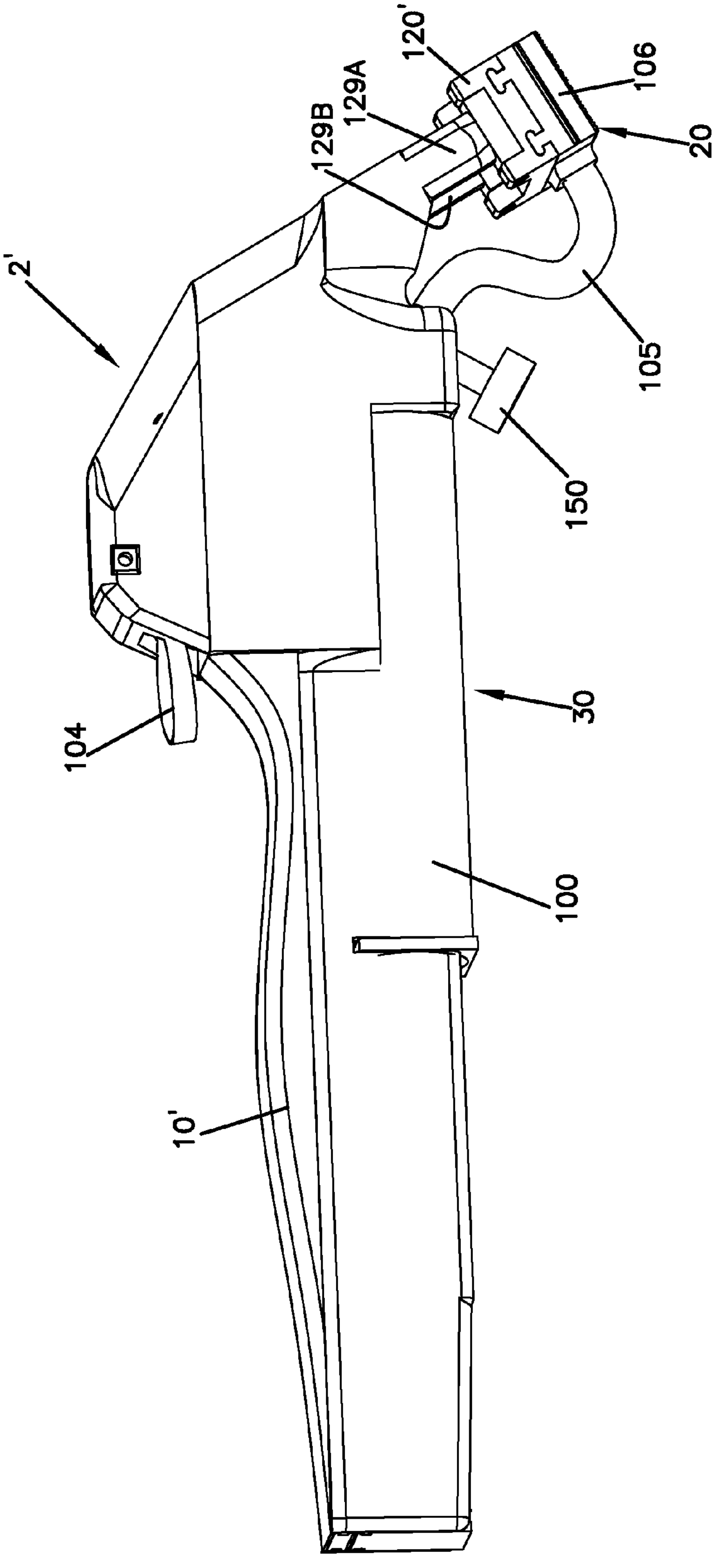
FIG. 10 is a side view of a painting apparatus according to some embodiments of the disclosed subject matter.
Figure 11:
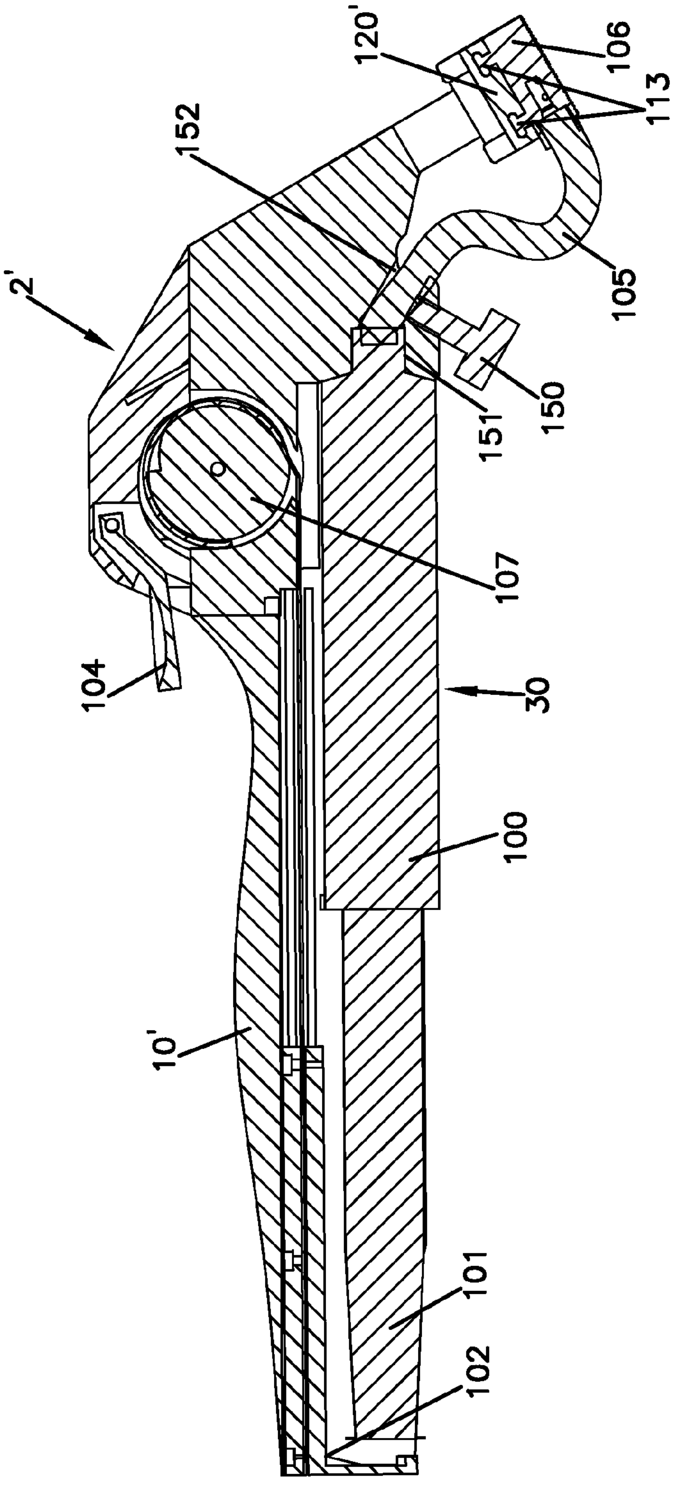
FIG. 11 is a side cross-sectional view of a painting apparatus according to some embodiments of the disclosed subject matter.
Figure 12:
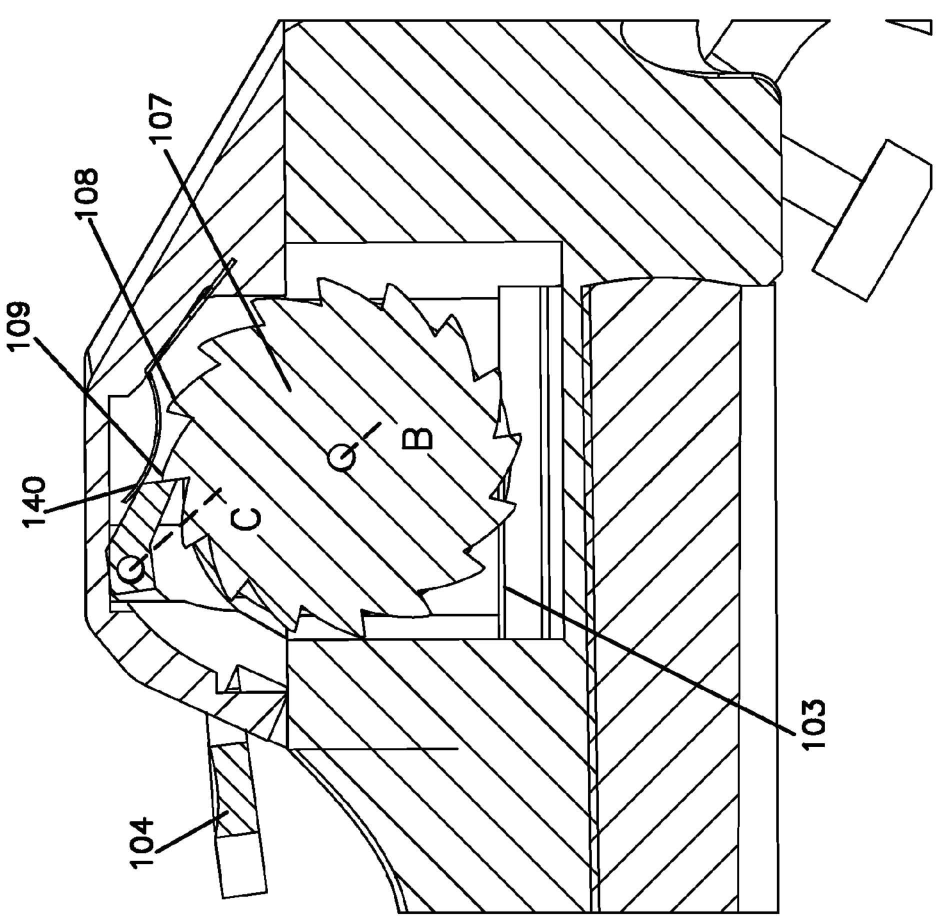
FIG. 12 is a cut-away side view of a portion of an urging mechanism of a painting apparatus according to some embodiments of the disclosed subject matter.
Figure 13A:
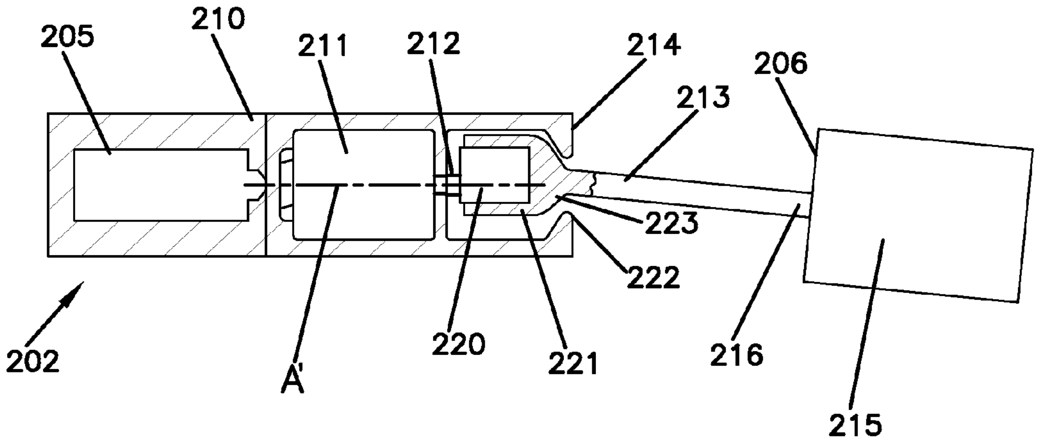
FIG. 13A is a cross-sectional view of a painting apparatus according to some embodiments of the disclosed subject matter.
Figure 13B:
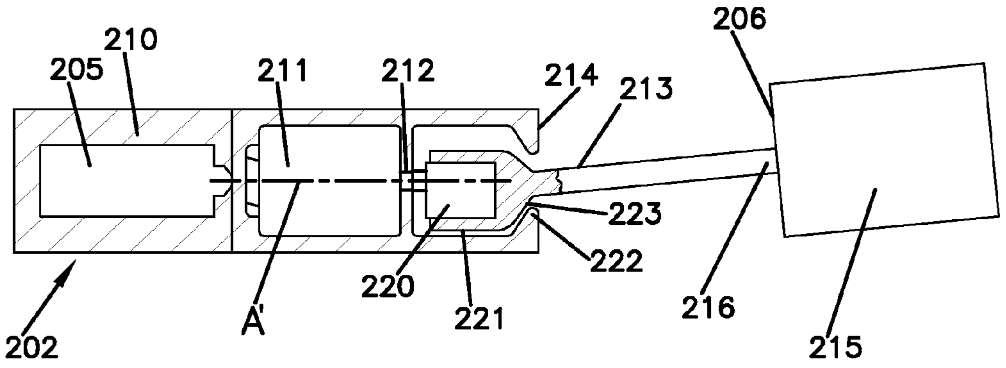
FIG. 13B is a cross-sectional view of a painting apparatus according to some embodiments of the disclosed subject matter.
Figure 14A:
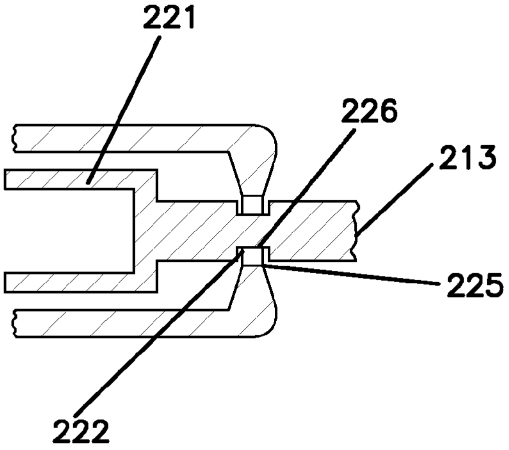
FIG. 14A is a cross-sectional view of a portion of a painting apparatus according to some embodiments of the disclosed subject matter.
Figure 14B:
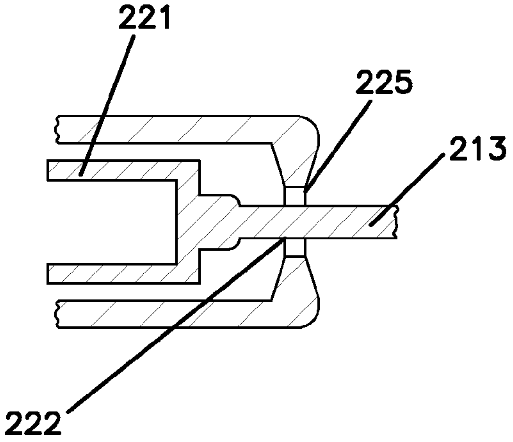
FIG. 14B is a cross-sectional view of a portion of a painting apparatus according to some embodiments of the disclosed subject matter.

Referring now to FIGS. 10-12, in certain examples, a painting device 2' is similar to the device 2 described above, but includes a paint applicator 20 that is stationary with respect to a body 10' of the device 2' and does not include an actuator to vibrate the paint applicator 20 against a work surface. In one example, components related to dispensing paint are substantially similar to those components described above. In certain examples, the vibratory shuttle 120 of the device 2 can be replaced with an attachment surface rigidly attached to the body 10' with the support struts 129A, 129B. The disposable painting module 30 and the connections with the body 10' can be substantially similar to those of the previous examples of the device 2 discussed above. In this way, the device 2' allows for substantially constant dispensing of paint at a substantially uniform rate to allow relatively uniform paint application to the work surface. In certain examples, paint flow can be user adjustable using a flow control 150 similar to the flow control 150 discussed above, such that paint output can be generally tuned to a user's painting rate. In some examples, the user adjustable flow control and the substantially constant flow rate provided by a constant force spring urging mechanism can allow the user to relatively continually and substantially uniformly dispense paint. Moreover, as with the device 2 described above, the disposable aspect of the painting module 30 of the device 2' can allow for decreased clean-up time and enhance performance of the device 2'.

Referring to FIGS.13A, 13B, 14A, and 14B, in certain examples, a painting device 202 comprises a body 210. In some examples, the body 210 can include a battery compartment 205 and a motor 211, for instance an electric motor 211. The electric motor 211 can receive current from one or more batteries within the compartment 205 via a switch. The motor 211 can include a motor output 212 rotatable about a longitudinal axis A'. A lever arm 213 can extend generally in line with the longitudinal axis of the body 210 beyond one end 214 of the body 210. In some examples, a disposable paint pad 215 and a manifold 206 can be releasably attached at a remote distal end 216 of the lever arm 213 and another end of the lever arm 213 can couple with the motor output 212. In one example, the coupling between the motor output 212 and the lever arm 213 can be include a cam feature 220 on the motor output 212 and a mating follower cup feature 221 on the lever arm 213. In certain examples, the follower cup 221 can slidingly fit over the cam 220 and can bear against a surface of the cam feature 220 during use. In this manner, when the motor output 212 rotates, the mechanical coupling between the cam 220 and the follower cup 221 translates the rotation into an oscillatory or other vibratory motion of the lever arm 213. In some examples, the lever arm 213 can be pivotably supported intermediate its length by an aperture 222 formed in the distal end 214 of the body 210. In some examples, this can be accomplished with a ball and socket type joint in which the lever arm 213 includes a ball feature 223 that can mate with the aperture socket 222. In other examples, other types of pivot joints are contemplated herein. For example, referring to FIG. 14A, a circular washer 225 can be mounted in the aperture 222 and can fit within a peripheral groove 226 formed in the lever arm 213. In another example, referring to FIG. 14B, a similar configuration is shown without a peripheral groove in the lever arm 213.

In these examples, the paint pad 215 can be oscillated or otherwise vibrated in a direction opposite to the force applied to the follower cup 221 by the cam 220. For instance, referring to FIG. 13A, as the cam 220 is offset above the longitudinal axis A', the lever arm 213 pivots such that the paint pad 215 can be offset below the longitudinal axis A'. In further examples, referring now to FIG. 13B, the cam 220 is offset below the longitudinal axis A' to pivot the paint pad 215 above the longitudinal axis A'. In some examples, the cam 220 and cup 221 can be shaped such that this oscillatory or otherwise vibratory motion can result in the paint pad 215 traveling in a substantially circular path about the longitudinal axis A'. In other examples, the cam 220, cup 221, and pivot joint can be shaped such that the paint pad 215 can be moved back and forth between any path about the longitudinal axis A'. In certain examples, the motion of the paint pad 215 can be back and forth motion that falls generally within one plane of motion (side to side type motion or longitudinally fore and aft).

In other examples, it is contemplated that the oscillatory or vibratory motion of the paint pad 215 can be accomplished in a number of different configurations. In one example, the motor output 212 can include the cam feature 220 and the lever arm 213 can include the mating follower cup feature 221. In another example, this configuration can be reversed such that the motor output 212 includes a follower cup and the lever arm includes a mating cam.

Figure 15:
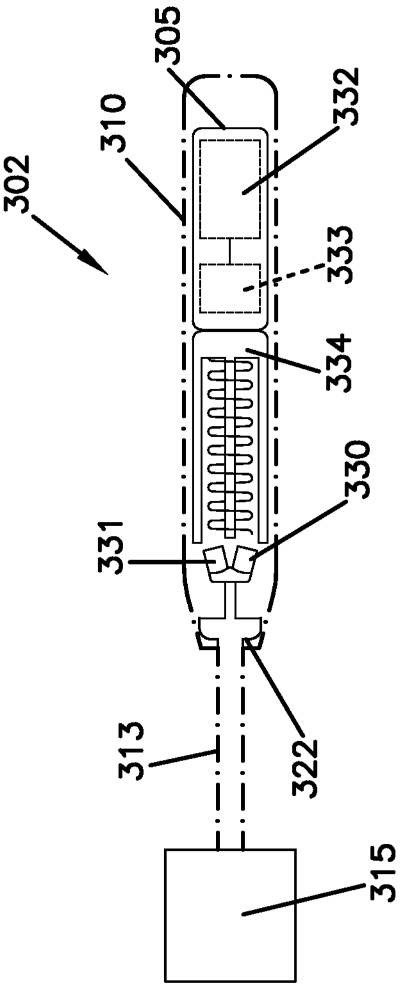
FIG. 15 is a cross-sectional view of a painting apparatus according to some embodiments of the disclosed subject matter.

Referring to FIG. 15, in certain examples, oscillatory or vibratory motion of a paint pad 315 can be accomplished in a painting device 302 including a configuration in which a proximal end of a lever arm 313 includes a pair of permanent magnets 330, 331 mounted side by side and with opposite polarities. In some examples, the lever arm 313 can be mounted for pivotal movement at a pivot member 322. A body 310 of the device 302 can include a battery compartment 305 and an electromagnet 334 which can receive an alternating current driving signal from an oscillator 333 and a battery 332. For instance, the action of the alternating current in the electromagnet 334 interacting with permanent magnets 330, 331 can cause the lever arm 313 to move about the pivot member 322 first in one direction and then in an opposing direction to provide the desired oscillating or vibrating effect.

Figure 16:
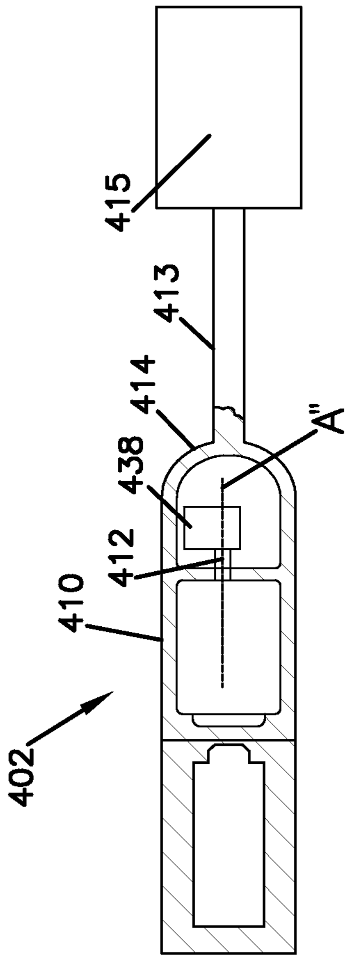
FIG. 16 is a cross-sectional view of a painting apparatus according to some embodiments of the disclosed subject matter.

Referring to FIG. 16, in certain examples, oscillatory or vibratory motion of a paint pad 415 can be accomplished in a painting device 402 including a configuration in which a lever arm 413 can be vibrated using an offset flywheel 438 connected to a motor output 412. In this way, vibration can be produced as the offset flywheel 438 pivots or swings about a longitudinal axis A". In some examples, the lever arm 413 can be integrally attached with an end 414 of a body 410. In this manner, the vibration created by rotating the offset flywheel 438 can be transferred through the body 410, which can result in vibration of the lever arm 413 and the paint pad 415, attached thereto.

Figure 17:
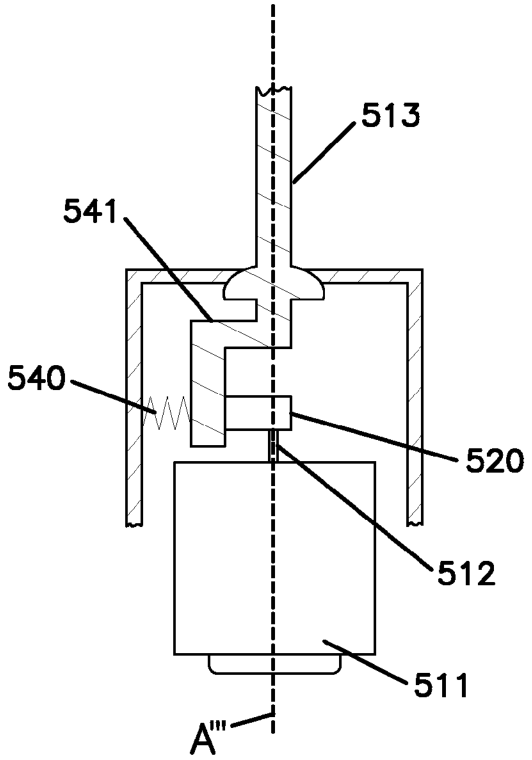
FIG. 17 is a cross-sectional view of a portion of a painting apparatus according to some embodiments of the disclosed subject matter.

Referring to FIG. 17, in certain examples, oscillatory or vibratory motion of a paint pad can be accomplished in a painting device including a spring 540 that can bias a lever arm 513 in one planar direction against a surface of a cam 520. In some examples, as the cam 520 rotates about a longitudinal axis A'", an offset radius can apply force to the lever arm 513 opposing force of the spring 540. In an example, as the spring 540 compresses, the lever arm 513 can pivot. In some examples, as the cam 520 rotates and the radius in contact with the lever arm 513 is reduced, the spring 540 can pivot the lever arm 513 in the opposite direction to complete a cycle of motion. In this way, the cycle can result in the lever arm 513 and the attached paint pad oscillating about the longitudinal axis A'''. In some examples, the lever arm 513 can include a step 541 to accommodate spatial constraints for this configuration.

Figure 18:
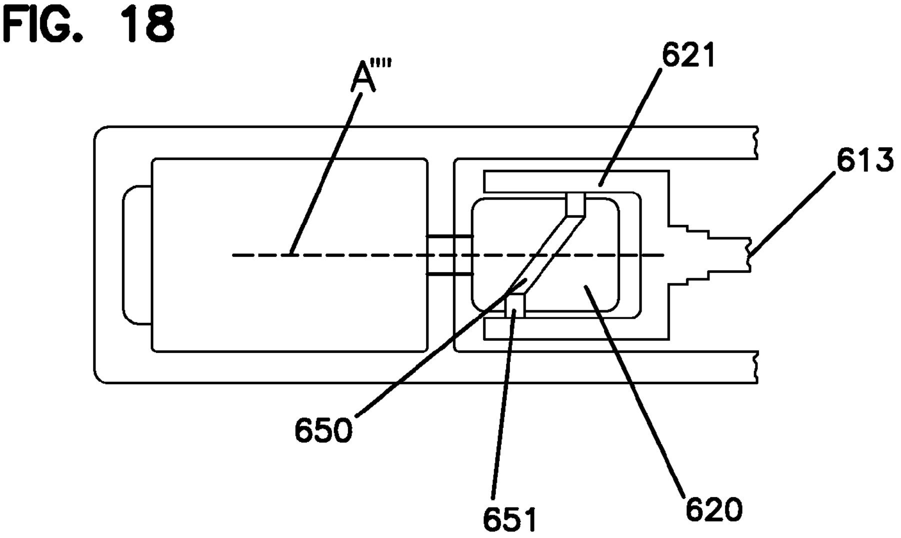
FIG. 18 is a cross-sectional view of a portion of a painting apparatus according to some embodiments of the disclosed subject matter.

Referring to FIG. 18, in certain examples, oscillatory or vibratory motion of a paint pad can be accomplished in a painting device including a cam 620 that can include a peripheral continuous channel 650 extending generally in an axial direction with respect to a longitudinal axis A''''. In some examples, a follower cup 621 includes a finger 651 that can engage the channel 650, such that when a drive shaft rotates, the cup 621, and, in turn, a lever arm 613, is urged backward and forward along the longitudinal axis A''''. In some examples, the cam 620 rotating against the follower cup 621 can provide oscillatory or otherwise vibratory motion that is generally perpendicular to the longitudinal axis A'''', and the channel 650 and finger 651 can provide oscillatory or otherwise vibratory motion that is generally in line or parallel with the longitudinal axis A''''. In some examples, the device can include a pivot configuration similar to that described above with respect to FIG. 14B. In this way, the lever arm 613 can be caused to move forward and backward along the longitudinal axis A''''.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A hand-held paint edging apparatus configured to be held and operated by a single hand of a user, comprising:

(a) a handle housing arranged and configured to be operatively held and carried by a person's hand and to detachably receive a painting module;

(b) said painting module configured to be disposable, rapidly engaged with and carried by said handle housing and rapidly detachably removable from said handle housing, comprising:

(i) a paint applicator arranged and configured for rapid detachable engagement with said handle housing and configured to slidably apply paint in edging manner through a porous applicator to a work surface;

(ii) a paint reservoir having an outlet fluidly coupled with said paint applicator and arranged and configured for rapid detachable engagement with said handle housing, said paint reservoir comprising a syringe body having a fluid outlet and a plunger slidable within said syringe body for discharging paint from said syringe body and through said fluid outlet; and (iii) a fluid coupling connected to operatively deliver paint from said paint reservoir fluid outlet to said paint applicator;

(c) an urging mechanism mounted to the handle housing and configured to impart a substantially constant force on said plunger along an entire operative paint discharge stroke of said plunger within said syringe body to discharge paint from said paint reservoir outlet at a substantially uniform flow rate;

(d) a flow control mechanism operatively connected to said urging mechanism to controllably regulate flow of paint through said fluid coupling between no flow and selectively enabled flow positions;

(e) a trigger mechanism mounted to said handle housing and operatively connected to said flow control mechanism and operable between non-actuated and actuated positions by the same hand of a user that operatively holds said paint edging apparatus, said trigger mechanism being operable when moved to said actuated position to move said flow control mechanism to selectively enable fluid flow through said fluid coupling; and (f) wherein said paint edging apparatus is operable to uniformly and continuously apply paint from said paint reservoir through said paint applicator to a work surface as said paint applicator is advanced along an edging path; and wherein said painting module is rapidly detachable from said handle housing after use for disposal and/or replacement by another painting module.

2. The apparatus of claim 1, wherein the paint applicator includes a manifold having an inlet operatively connected to receive paint from said fluid coupling, and at least one paint dispensing opening, the manifold configured to receive paint through said inlet from the paint reservoir and to discharge the received paint through the paint dispensing opening.

3. The apparatus of claim 2, wherein the manifold includes more than one said paint dispensing opening configured to discharge paint.

4. The apparatus of claim 2, wherein the porous applicator of said paint applicator includes a pad attached to the manifold, the pad configured to accept the paint discharged from said paint dispensing opening and to apply said paint to the work surface.

5. The apparatus of claim 1, wherein said urging mechanism is configured to selectively engage, retain and align the plunger within the syringe body.

6. The apparatus of claim 5, wherein the urging mechanism includes an enclosure for receiving said reservoir wherein when the urging mechanism is disengaged from the reservoir plunger, clear access is provided into said enclosure for loading or unloading said paint reservoir into said enclosure, and no dispensing force is transmitted to said plunger.

7. The apparatus of claim 1, further comprising a vibrator mounted to said handle housing and operatively connected to said paint applicator to impart vibratory and/or reciprocal motion to the paint applicator.

8. The apparatus of claim 7, wherein said vibrator is configured to be selectively powered through a switch.

9. The apparatus of claim 8, wherein said trigger mechanism is operatively connected to said vibrator switch, said trigger when moved to said actuated position being operable to close said switch to provide power to said vibrator.

10. The apparatus of claim 7, wherein said vibrator causes a surface of said porous paint applicator that is configured to engage the work surface, to move in a back and forth reciprocal manner within a single plane of motion and in a direction substantially parallel with the direction of edging motion of said porous applicator over said work surface; whereby movement of said paint applicator along a straight edging path is enhanced.

11. The apparatus of claim 1, further comprising a second flow control mechanism operatively connected with said fluid coupling, configured to alter a rate at which the paint is supplied from the paint reservoir to the paint applicator.

12. The apparatus of claim 1, wherein said flow control apparatus and said trigger mechanism do not come into contact with paint flowing through said fluid coupling.

13. The apparatus of claim 1, wherein only the components of the disposable painting module come into contact with paint during operation of the paint edging apparatus, thereby eliminating need for cleaning paint from the apparatus after use.

14. A hand-held paint edging apparatus comprising:

(a) a handle housing arranged and configured to be operatively held and carried by a single hand of a user;

(b) a removable and replaceable disposable painting module configured to be rapidly detachably engaged with and carried by said handle housing, said painting module comprising:

(i) a paint applicator arranged and configured for detachable engagement with said handle housing and configured to slidably apply paint in an edging manner through a porous applicator to a work surface;

(ii) a paint reservoir having an outlet fluidly coupled with said paint applicator and arranged and configured for detachable engagement with said handle housing, comprising:

(1) a syringe body having a fluid outlet;

(2) a plunger coaxially aligned for movement within the syringe body; and (3) an operative seal suitable for viscous fluids such as paint, said seal slidably, sealingly arranged between the syringe body and plunger, wherein movement of said plunger away from said fluid outlet creates a filling stroke for drawing fluid into said syringe body through said fluid outlet, and wherein movement of said plunger towards said fluid outlet creates a dispensing stroke for forcing fluid out of said syringe body through said fluid outlet; and (iii) a fluid coupling connected to operatively deliver paint from said reservoir fluid outlet to said paint applicator;

(c) an urging mechanism including a constant force spring mounted to the handle housing, said urging mechanism arranged to operatively engage said plunger to help coaxially align the plunger within the syringe body, said urging mechanism arranged and configured to apply constant force to said plunger as it moves along its entire said dispensing stroke toward said fluid outlet;

(d) an electric vibrator mounted to said handle housing and operatively connected to said paint applicator and to receive energizing power from a power source, for imparting when energized through a switch, oscillatory vibrating motion to said paint applicator; and (e) a trigger mechanism mounted to said handle housing and operatively connected to said switch and to said fluid coupling, said trigger mechanism being operable by the same hand of a user that operatively holds the paint edging apparatus, said trigger mechanism being operable between actuated and non-actuated positions to:

(i) close said switch to provide energizing power to said electric vibrator, while simultaneously selectively enabling and controlling the rate of fluid flow through said fluid coupling when moved to said actuated position; and (ii) open said switch to de-energize said electric vibrator, and simultaneously stop fluid flow through said fluid coupling when moved to said non-actuated position; and (f) wherein said paint edging apparatus is operable to uniformly and continuously apply paint from said paint reservoir through said paint applicator to a work surface as said applicator is advanced along an edging path; and wherein said painting module is rapidly detachable form said handle housing after use for disposal and/or replacement by another painting module.

15. The apparatus of claim 14, wherein the paint applicator includes a manifold having an inlet fluidly coupled to said fluid coupling and at least one paint dispensing opening, the manifold configured to receive paint through said inlet from the paint reservoir and to discharge the received paint through the paint dispensing opening.

16. The apparatus of claim 14, wherein a movable portion of said paint applicator is configured to be selectively powered to vibrate with respect to the handle housing.

17. The apparatus of claim 14, wherein the paint applicator includes a slider feature configured to slidably engage within a track feature of said handle housing to removably engage the paint applicator with the handle housing.

18. The apparatus according to claim 14, wherein the painting module contains all of the paint engaging and carrying portions of said apparatus.

19. The apparatus according to claim 14, wherein said porous applicator has a generally planar lower surface configured to engage said work surface to which edging paint is to be applied, wherein said paint applicator has a sidewall oriented generally perpendicular to said lower surface; and wherein said sidewall includes a protruding edging feature for maintaining a small gap between a surface adjacent and generally perpendicular to the work surface, and a side edge of said porous applicator.

20. The apparatus according to claim 14, further comprising a second flow control mechanism independently operable from said trigger mechanism and operably connected to said fluid coupling for selectively adjusting the rate of fluid flow through said fluid coupling for accommodating varied paint viscosities.

21. A hand-held paint edging apparatus comprising:

(a) a handle housing arranged and configured to be operatively held and carried by a single hand of a user;

(b) a removable and replaceable disposable painting module configured to be rapidly detachably engaged with and carried by said handle housing, said painting module comprising:

(i) a paint applicator arranged and configured for detachable engagement with said handle housing and configured to slidably apply paint in an edging manner through a porous applicator to a work surface;

(ii) a paint reservoir having an outlet fluidly coupled with said paint applicator and arranged and configured for detachable engagement with said handle housing; comprising:

(1) a syringe body having a fluid outlet;

(2) a plunger coaxially aligned for movement within the syringe body; and (3) an operative seal suitable for viscous fluids such as paint, said seal slidably, sealingly arranged between the syringe body and plunger, wherein movement of said plunger away from said fluid outlet creates a filling stroke for drawing fluid into said syringe body through said fluid outlet, and wherein movement of said plunger towards said fluid outlet creates a dispensing stroke for forcing fluid out of said syringe body through said fluid outlet; and (iii) a fluid coupling connected to operatively deliver paint from said reservoir fluid outlet to said paint applicator;

(c) an urging mechanism including a constant force spring mounted to the handle housing, said urging mechanism arranged to operatively engage said plunger to help coaxially align the plunger within the syringe body, said urging mechanism arranged and configured to apply constant force to said plunger as it moves along its entire said dispensing stroke toward said fluid outlet;

(d) an electric vibrator mounted to said handle housing and operatively connected to said paint applicator and to receive energizing power from a power source, for imparting when energized through a switch, oscillatory vibrating motion to said paint applicator; and (e) a trigger mechanism mounted to said handle housing and operatively connected to said switch and to said fluid coupling, said trigger mechanism being operable between multiple alternative actuation modes including:

(i) a first actuation mode whereby said trigger mechanism selectively enables and controls the rate of fluid flow through said fluid coupling, but the vibrator is not activated; or (ii) a second actuation mode whereby said trigger mechanism closes said switch to activate said vibrator, but no paint flow is enabled through said fluid coupling to said paint applicator; or (iii) a third actuation mode whereby said trigger mechanism both activates said vibrator by closing said switch, and enables delivery of paint to said paint applicator by selectively controlling the rate of paint flow through said fluid coupling.

* * * * *